(12) United States Patent
Stahl et al.

(10) Patent No.: US 6,437,468 B2
(45) Date of Patent: Aug. 20, 2002

(54) PERMANENT MAGNET ROTOR COOLING SYSTEM AND METHOD

(75) Inventors: David A. Stahl; Phillip B. Vessa, both of Thousand Oaks, CA (US)

(73) Assignee: Capstone Turbine Corporation, Chatsworth, CA (US)

( * ) Notice: Subject to any disclaimer, the term of this patent is extended or adjusted under 35 U.S.C. 154(b) by 0 days.

(21) Appl. No.: 09/829,778

(22) Filed: Apr. 10, 2001

Related U.S. Application Data

(63) Continuation of application No. 09/558,406, filed on Apr. 24, 2000.

(51) Int. Cl.$^7$ ................................................ H02K 9/00
(52) U.S. Cl. ............................ 310/61; 310/58; 310/59; 310/261
(58) Field of Search ........................... 310/61, 261, 58, 310/59, 52

(56) References Cited

U.S. PATENT DOCUMENTS

| | | | | |
|---|---|---|---|---|
| 4,546,279 A | * | 10/1985 | Hammer et al. .............. | 310/59 |
| 4,902,922 A | * | 2/1990 | Annovazzi .................... | 310/61 |
| 4,922,147 A | * | 5/1990 | Sismour et al. ............... | 310/61 |
| 5,019,733 A | | 5/1991 | Kano et al. ................... | 310/61 |
| 5,427,455 A | * | 6/1995 | Bosley ........................ | 384/106 |
| 5,994,804 A | * | 11/1999 | Grennan et al. .......... | 310/60 R |
| 6,087,744 A | * | 7/2000 | Glauning ..................... | 310/58 |

FOREIGN PATENT DOCUMENTS

FR    2 770 941    5/1999

* cited by examiner

*Primary Examiner*—Burton S. Mullins
(74) *Attorney, Agent, or Firm*—Irell & Manella LLP

(57) ABSTRACT

A permanent magnet rotor cooling system and method in which the rotor end cap includes an axially extending bore with a plurality of radially extending holes aligned with holes in the sleeve around the permanent magnet to provide cooling air flow to the air gap between the permanent magnet sleeve and the stator. A second smaller diameter extended bore, with a second plurality of radially extending holes, offset from the first plurality of holes, may also be provided.

3 Claims, 3 Drawing Sheets

PERMANENT MAGNET ROTOR COOLING SYSTEM AND METHOD

This is a Continuation Ser. No. 09/558,406 filed Apr. 24, 2000.

TECHNICAL FIELD

This invention relates to the general field of permanent magnet generator/motors and more particularly to an improved system and method for cooling the permanent magnet rotor of a permanent magnet generator/motor.

BACKGROUND OF THE INVENTION

A permanent magnet generator/motor generally includes a rotor assembly having a plurality of equally spaced magnet poles of alternating polarity around the outer periphery of the rotor or, in more recent times, a solid structure of samarium cobalt or neodymium-iron-boron. The rotor is rotatable within a stator which generally includes a plurality of windings and magnetic poles of alternating polarity. In a generator mode, rotation of the rotor causes the permanent magnets to pass by the stator poles and coils and thereby induces an electric current to flow in each of the coils. Alternately, if an electric current is passed through the stator coils, the energized coils will cause the rotor to rotate and thus the generator will perform as a motor.

The permanent magnet materials utilized in the permanent magnet rotor do not hold their magnetic properties above a given temperature, that is, they will lose their magnetic properties if they are subjected to a temperature above a certain limit. Neodymium-iron-cobalt permanent magnets, for example, may be permanently demagnetized if subjected to a temperature above 350 degrees Fahrenheit, while samarium-cobalt permanent magnets may be permanently demagnetized if subjected to temperatures above 650 degrees Fahrenheit. Even operating at temperatures close to the above limits can degrade performance of and/or damage the permanent magnet material.

In use, the permanent magnet material is usually enclosed within a sleeve of non-magnetic material. Intimate contact between the non-magnetic material sleeve and the permanent magnet material is achieved by inserting the permanent magnet into the permanent magnet sleeve with a radial interference fit by any number of conventional techniques.

During operation of the permanent magnet generator/motor, the non-magnetic sleeve is subjected to eddy currents and aerodynamic heating. Because of the intimate contact between the non-metallic sleeve and the permanent magnet, the heat from the non-magnetic sleeve is transferred to the permanent magnet. Such heating must be taken into consideration when selecting permanent magnet materials for a permanent magnet generator/motor.

Since the radial air gap between the outer diameter of the permanent magnet rotor sleeve and the inner diameter of the stator is deliberately kept small to enhance magnetic performance, the resulting annular clearance through which cooling air can travel axially severely restricts the flow of cooling air. When this air gap is on the order of 0.050 inches, there simply is not enough annular clearance for sufficient cooling air to flow.

One of the applications of a permanent magnet generator/motor is referred to as a turbogenerator/motor which includes a power head mounted on the same shaft as the permanent magnet generator/motor, and also includes a combustor and recuperator. The turbogenerator/motor power head would normally include a compressor, a turbine and a bearing rotor through which the permanent magnet generator/motor tie rod passes. The compressor is driven by the turbine which receives heated exhaust gases from the combustor supplied with preheated air from the recuperator.

SUMMARY OF THE INVENTION

Thus, in one aspect, the present invention provides a motor/generator comprising a housing, a generally cylindrical rotor assembly mounted for rotation about an axis of rotation in the housing, and at least one air passage in said rotor assembly for pumping cooling air into said housing, the air passage communicating between at least one air intake orifice and at least one air exhaust orifice, the air exhaust orifice located at a distance from said axis of rotation greater than the distance between the air intake orifice and the axis of rotation.

In a further aspect of the invention, the rotor assembly comprises a plurality of air passages. In a still further aspect, the rotor assembly comprises a central axial bore and a plurality of air passages extending from the bore to a plurality of air exhaust passages. In yet another aspect, the motor/generator housing includes a stator surrounding the rotor assembly to form an annular space to direct the flow of cooling air.

BRIEF DESCRIPTION OF THE DRAWINGS

Having described the present invention in general terms, reference will now be made to the accompanying drawings in which.

DETAILED DESCRIPTION OF THE PREFERRED EMBODIMENTS

Figure 1:
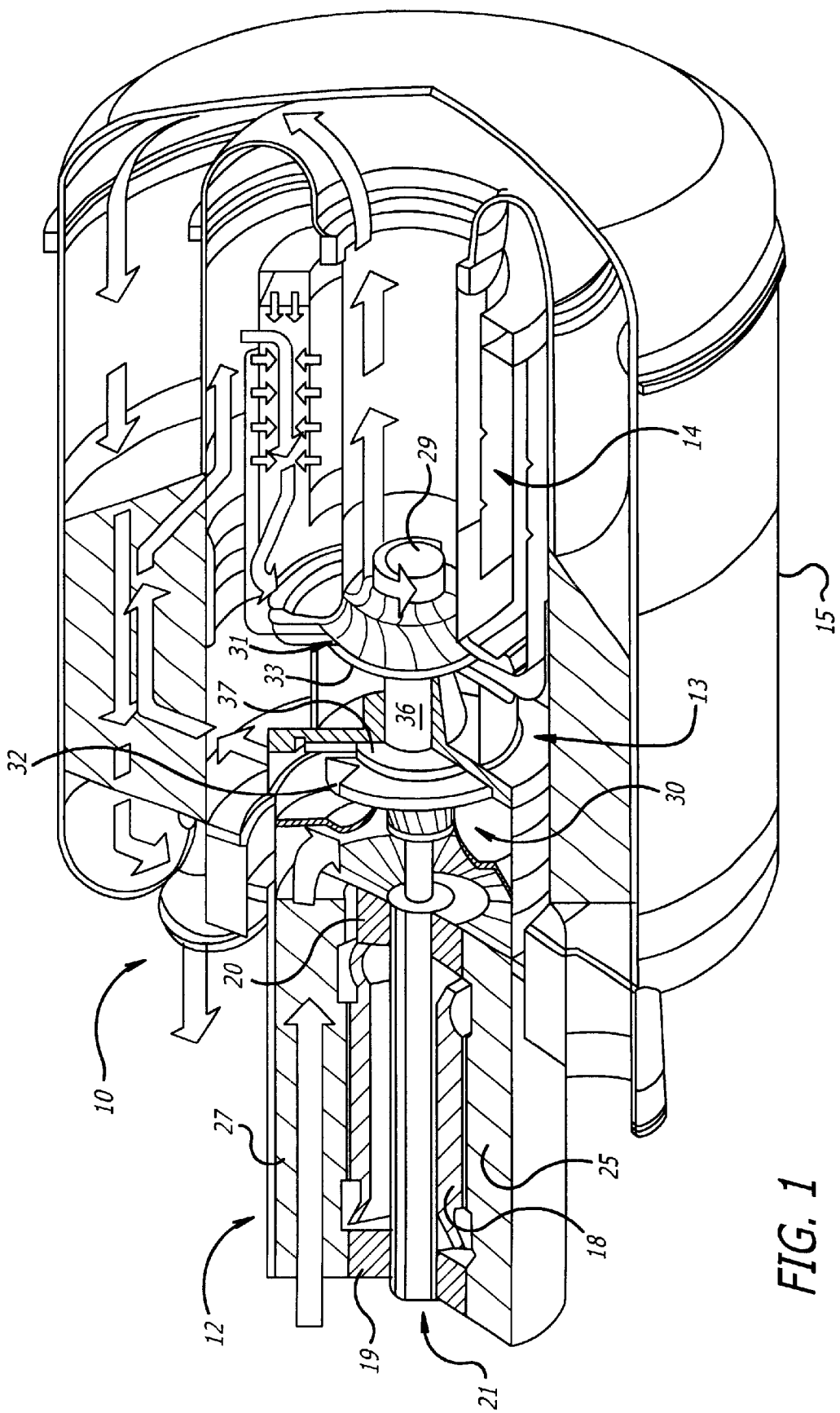
FIG. 1 is a sectional view of a turbomachine that can utilize the system and method for cooling a permanent magnet rotor of the present.

A permanent magnet turbogenerator 10 is illustrated in FIG. 1 as an example of a turbomachine utilizing the system and method of the present invention. The permanent magnet turbogenerator 10 generally comprises a permanent magnet generator/motor 12, a power head 13, and a combustor 14.

The permanent magnet generator/motor 12 includes a permanent magnet rotor 21 having a cylindrical sleeve 16 with a permanent magnet 17 disposed therein, rotatably supported within a stator 18 by a pair of spaced journal bearings 19, 20. Radial stator cooling fins 25 are enclosed in a cylindrical sleeve 27 to form an annular air flow passage to cool the permanent magnet stator 18 and with air passing through on its way to the power head 13.

The permanent magnet sleeve 16 and permanent magnet 17 collectively form the rotatable permanent magnet rotor or shaft 21. The power head 13 of the permanent magnet turbogenerator 10 includes compressor 30 and turbine 31. The compressor 30 having compressor impeller 32, which receives air from the annular air flow passage in cylindrical sleeve 27 around the permanent magnet stator 18, is driven by the turbine 31 having turbine rotor 33 which receives heated exhaust gases from the combustor 14 supplied by air from recuperator 15. The compressor impeller 32 and turbine rotor 33 are disposed on bearing rotor 36 having bearing rotor thrust disk 37. The bearing rotor 36 is rotatably supported by a single journal bearing within the power head housing while the bearing rotor thrust disk 37 is axially supported by a bi-directional thrust bearing with one element of the thrust bearing on either side of the bearing rotor thrust disk 37.

The journal bearings would preferably be of the compliant foil hydrodynamic fluid film type of bearing, an example of which is described in detail in U.S. Pat. No. 5,427,455 issued Jun. 6, 1995 by Robert W. Bosley, entitled "Compliant Foil Hydrodynamic Fluid Film Radial Bearing" and is herein incorporated by reference. The thrust bearing would also preferably be of the compliant foil hydrodynamic fluid film type of bearing. An example of this type of bearing can be found in U.S. Pat. No. 5,529,398 issued Jun. 25, 1996 by Robert W. Bosley, entitled "Compliant Foil Hydrodynamic Fluid Film Thrust Bearing" and is also herein incorporated by reference.

Figure 2:
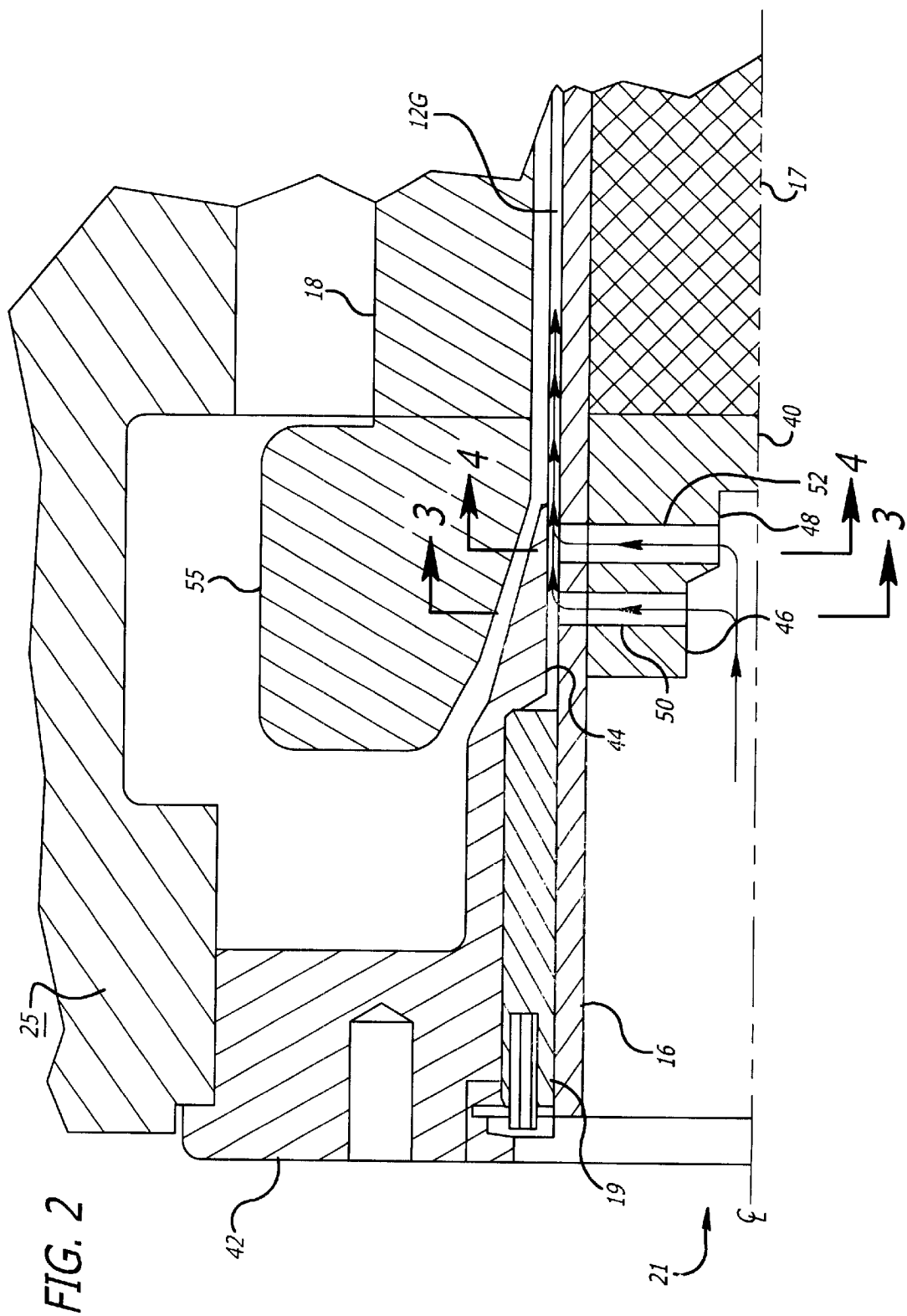
FIG. 2 is an enlarged sectional view of the forward or open end of permanent magnet generator/motor of the turbomachine of FIG. 1.
Figure 3:
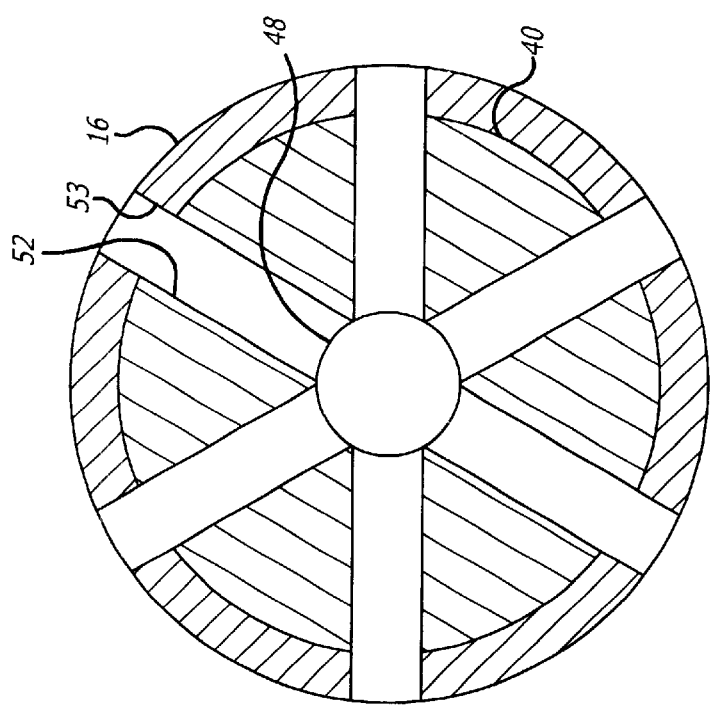
FIG. 3 is a sectional view of the permanent magnet generator/motor shaft taken along line 3—3 of FIG. 2.
Figure 4:
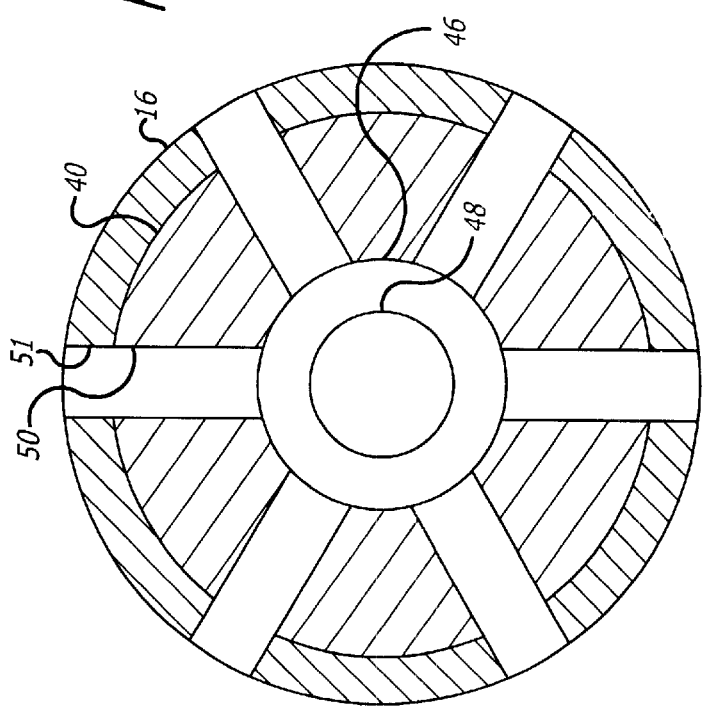
FIG. 4 is a sectional view of the permanent magnet generator/motor shaft taken along line 4—4 of FIG. 2.

The forward or open end of permanent magnet rotor 21 is shown in an enlarged section in FIG. 2. The permanent magnet sleeve 16 can be constructed of a non-magnetic metallic material, such as Inconel 718, or constructed of a composite material such as a carbon graphite wound sleeve. The permanent magnet 17, disposed within the permanent magnet sleeve 16, may be constructed of a permanent magnet material such as samarium cobalt, neodymium-iron-boron or similar materials. Both ends of the permanent magnet 17 would normally be enclosed with a cylindrical metallic end cap or plug 40 of a material such as brass.

The permanent magnet 17 and end caps 40 are interference fit within the sleeve 16 by any number of techniques, including heating the permanent magnet sleeve and supercooling the permanent magnet, hydraulic pressing, pressurized lubricating fluids, tapering the inside diameter of the permanent magnet sleeve and/or the outer diameter of the permanent magnet, and other similar methods or combinations thereof.

The forward or open end of the sleeve 16 is rotatably supported by journal bearing 19 within bearing support 42, which also includes an annular extension 44 over the forward end cap 40. The forward end cap 40 includes an outer bore 46 and an extended inner bore 48 of a smaller diameter than the outer bore 46.

The forward end cap 40 includes a first plurality of holes 50 (shown by way of example as six) radially extending from the outer bore 46 to the sleeve 16 with the holes 50 aligned with a like plurality of holes 51 in the sleeve 16. Also included in the end cap 40 are a second plurality of holes 52 which radially extend from the inner bore 48 to the sleeve 16 and are aligned with a like plurality of holes 53 in the sleeve 16. The holes 50 and 51 from the outer bore 46 are offset from the holes 52 and 53 from the inner bore 48. With the holes 50 and 51 at zero degrees (top vertical), sixty degrees, one-hundred twenty degrees, one-hundred eighty degrees, two-hundred forty degrees, and three-hundred degrees, then the holes 52 and 53 would be at thirty degrees, ninety degrees, one-hundred fifty degrees, two-hundred ten degrees, two-hundred seventy degrees, and three-hundred thirty degrees.

When the permanent magnet rotor 21 is rotated, air is drawn into the sleeve 16 and into both the outer bore 46 and extended inner bore 48, both in the end cap 40. The air is then pumped from the outer bore 46 through the plurality of radially extending holes 50 in the end cap 40 and through the holes 51 in the sleeve 16, and also from the inner bore 48 through the plurality of radially extending holes 52 in the end cap 40 and through the holes 53 in the sleeve 16.

The high rotational speed of the rotor, which can approach 100,000 rpm, creates a large pressure drop which induces a mass flow and air velocity in the air gap between the permanent magnet sleeve 16 and the stator 18. Centripetal/centrifugal forces derived from the rotor's rotational energy increases the pressure of the air passing through the holes 50, 51, 52, and 53.

With the bearing support 42 including an annular extension 44 over the sleeve 16 in the area outwards from the holes 51 and 53, the air flow exiting the holes 51 and 53 is deflected towards the air gap 12G between the sleeve 16 and the stator 18. The space between the bearing support 42 and the stator 18 can be a sealed chamber for the end turns 55 of the stator 18, the annular extension is not essential since the only exit from the sealed chamber for the pressurized air from holes 51 and 53 would be the air gap 12G between the sleeve 16 and the stator 18.

In this manner, cooling air is provided to the air gap 12G between the sleeve 16 and stator 18 to maintain the temperature of the permanent magnet 17 at a low enough temperature to prevent damage from the eddy currents and aerodynamic heating. This is accomplished with a simple yet effective system and method that does not add to the complexity of the permanent magnet turbogenerator/motor.

The cooling system and method is small and compact and does not effect the primary function of the generator rotor. The generator rotor will function as intended and aerodynamic of the system will not be effected by the cooling system and method. The small-integrated design does not block cooling air or intake air for the stator windings or engine such as would an external cooling fan. An external fan could have a blocking effect, as well as, the fan motor could reject heat that could be ingested into the engine intake, which could have a degrading effect on the performance of the engine.

The cooling system and method focuses the cooling air where it does the most good. It is not a general "blast" of airflow bathing all of the components. No external ducting is required to get the cooling air from an outside location to where it is required. Since the cooling system and method is powered by the rotation of the generator rotor, no external power is required. The cooling impeller would have a minimal parasitic loss effect when compared to any external cooling method that would require its own power and result in less electrical power to the end user.

Since the cooling system and method has no external circuits, switches, fuses etc., all of which could fail, it is very dependable. It will operate every time the generator operates. The cooling system and method requires fewer components than an external cooling source and, since it is independent, does not require any revision to the engine controller or control logic.

Cooling the permanent magnet to a lower operating temperature improves the reliability and robustness of the turbogenerator and the complete system by increasing the operating margin of the turbogenerator and the system as a whole and is particularly important at higher ambient temperatures.

Since the field strength of a permanent magnet is proportional to temperature, cooling the permanent magnet increases field strength, which in turn produces higher voltage in the stator. The reduction of heat radiating from the rotor, coupled with the cooling effect of air passing over the stator, causes a reduction in the temperature of he stator windings, which. lowers the resistance of the windings. This higher voltage and lower resistance reduces the current for a given kilowatt output or load. Since the efficiency and life of many power electronics, such as insulated-gate-bipolar transistors (IGBT's) is inversely proportional to current, this cooling system and method will therefore increase the efficiency of the turbogenerator system as a whole and increase the life of the magnet, stator windings, power electronics and other components.

While specific embodiments of the present invention have been illustrated and described, it is to be understood that these are provided by way of example only, and that the invention is not to be construed as being limited thereto but only by the proper scope of the following claims.

What we claim is:

1. A device, comprising:

a housing;

a generally cylindrical rotor assembly mounted for rotation about an axis of rotation in said housing;

at least one air passage in said rotor assembly for pumping cooling air into said housing, said at least one air passage communicating between at least one air intake orifice and at least one air exhaust orifice, said at least one air exhaust orifice located at a distance from said axis of rotation greater than the distance between said at least one air intake orifice and said axis of rotation;

said housing including a stator surrounding said rotor assembly; and an annular space formed between said stator and said rotor assembly, said annular space in communication with said at least one air exhaust orifice;

a plurality of exhaust orifices in said annular space and in communication with said at least one air passage to direct said cooling air within said annular space; and a plurality of air passages in communication with said plurality of exhaust orifices for pumping said cooling air into said annular space, said plurality of air passages including a plurality of air passages having different air flow resistance to create a pressure differential between said exhaust orifices in said annular space.

2. A device, comprising:

a housing;

a generally cylindrical rotor assembly mounted for rotation about an axis of rotation in said housing;

at least one air passage in said rotor assembly for pumping cooling air into said housing, said at least one air passage communicating between at least one air intake orifice and at least one air exhaust orifice, said at least one air exhaust orifice located at a distance from said axis of rotation greater than the distance between said at least one air intake orifice and said axis of rotation;

said housing including a stator surrounding said rotor assembly; and an annular space formed between said stator and said rotor assembly, said annular space in communication with said at least one air exhaust orifice;

a plurality of exhaust orifices in said annular space and in communication with said at least one air passage to direct said cooling air within said annular space;

a plurality of air passages in communication with said plurality of exhaust orifices for pumping said cooling air into said annular space, said plurality of air passages including a plurality of air passages having different air flow resistance to create a pressure differential between said exhaust orifices in said annular space; and said plurality of air passages further comprising at least one tapered air passage.

3. A device, comprising:

a housing;

a generally cylindrical rotor assembly mounted for rotation about an axis of rotation in said housing;

at least one air passage in said rotor assembly for pumping cooling air into said housing, said at least one air passage communicating between at least one air intake orifice and at least one air exhaust orifice, said at least one air exhaust orifice located at a distance from said axis of rotation greater than the distance between said at least one air intake orifice and said axis of rotation;

said housing including, a stator surrounding said rotor assembly;

an annular space formed between said stator and said rotor assembly, said annular space in communication with said at least one air exhaust orifice;

a plurality of exhaust orifices in said annular space and in communication with said at least one air passage to direct said cooling air within said annular space;

said rotor assembly further comprising;

a central bore formed along a portion of said axis;

a plurality of air passages extending from said central bore to said plurality of air exhaust orifices for pumping said cooling air into said housing; and said central bore further comprising;

a central bore having varying diameters, each of said diameters in communication with at least one of said plurality of air passages.

* * * * *